May 13, 1952 A. FARINELLI 2,596,391
AUXILIARY MOTOR FOR BICYCLES
Filed Nov. 1, 1946 7 Sheets-Sheet 1
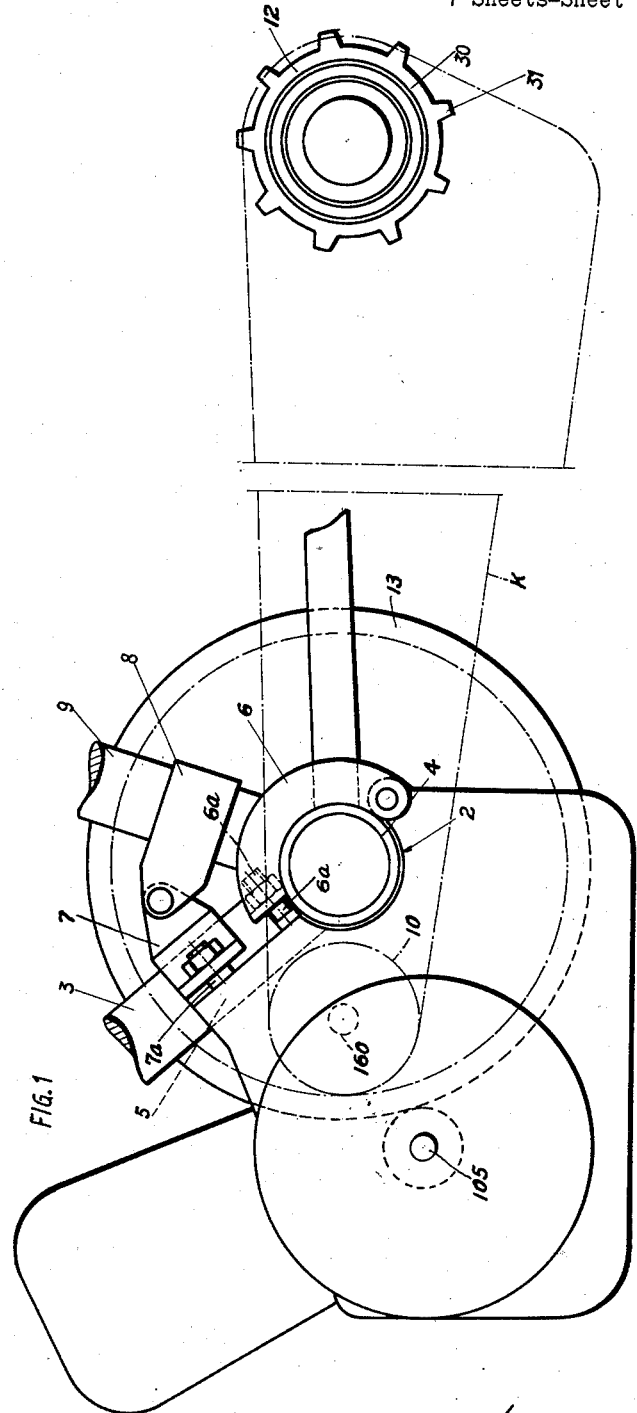
INVENTOR
ALDO FARINELLI
BY Young, Emery & Thompson
ATTYS-

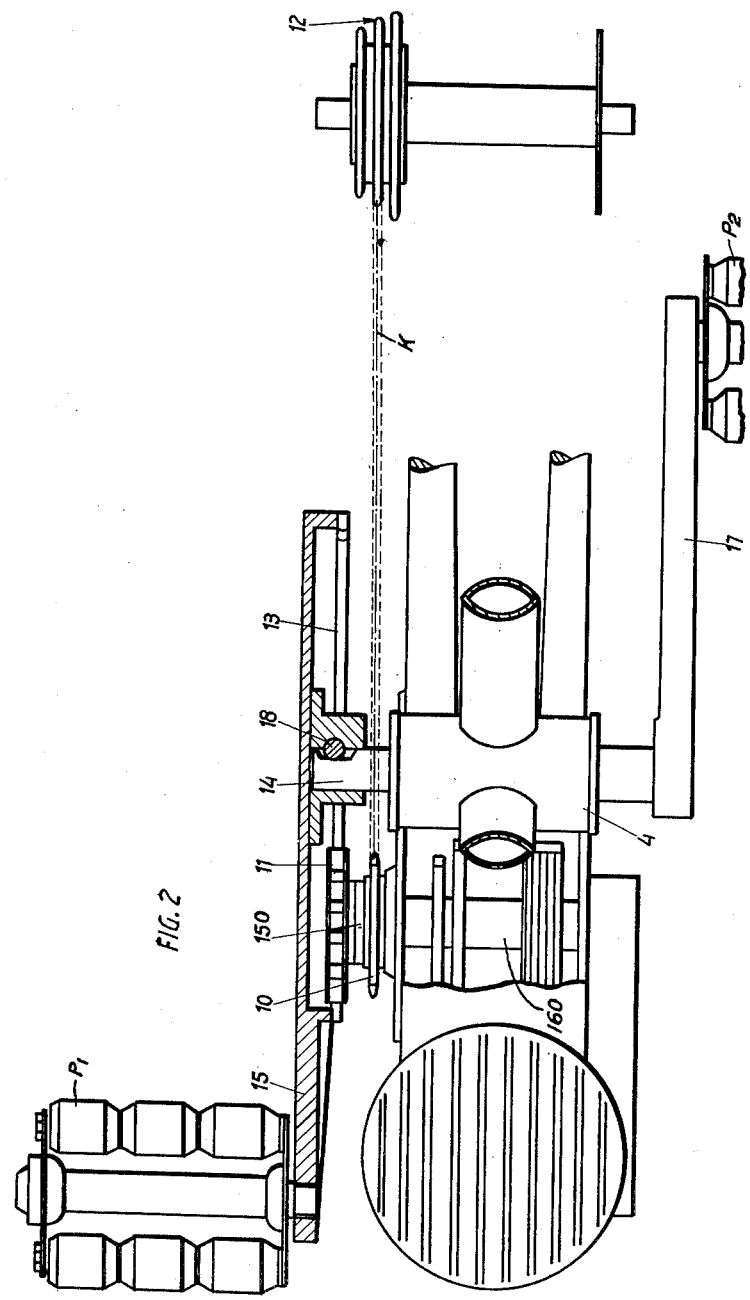

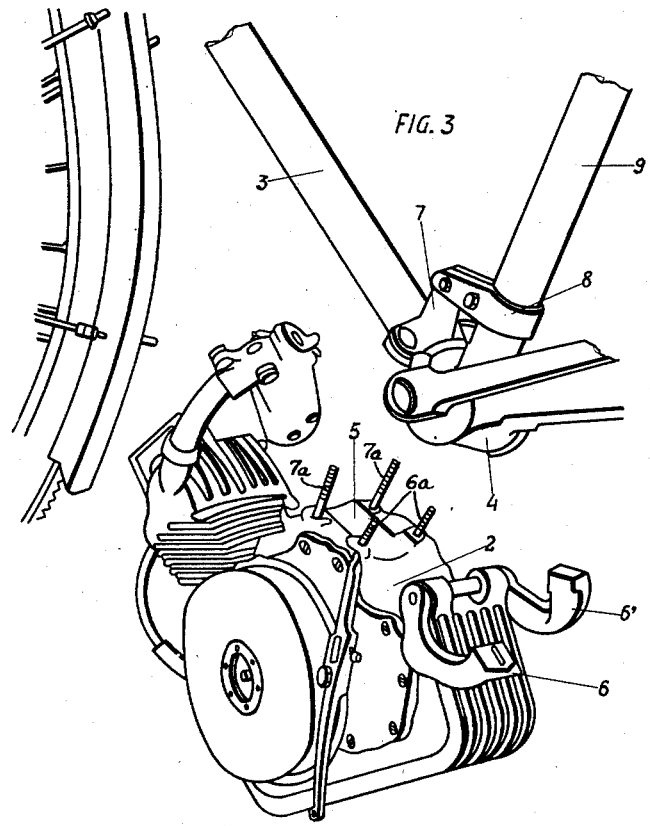

May 13, 1952        A. FARINELLI        2,596,391
AUXILIARY MOTOR FOR BICYCLES
Filed Nov. 1, 1946        7 Sheets-Sheet 4
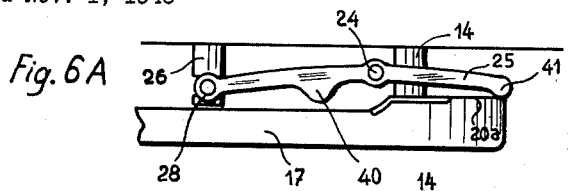
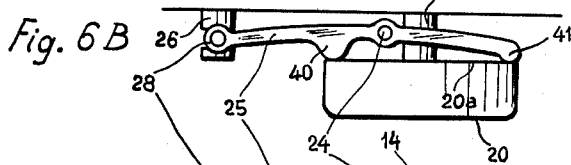
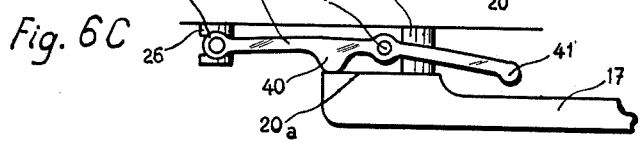
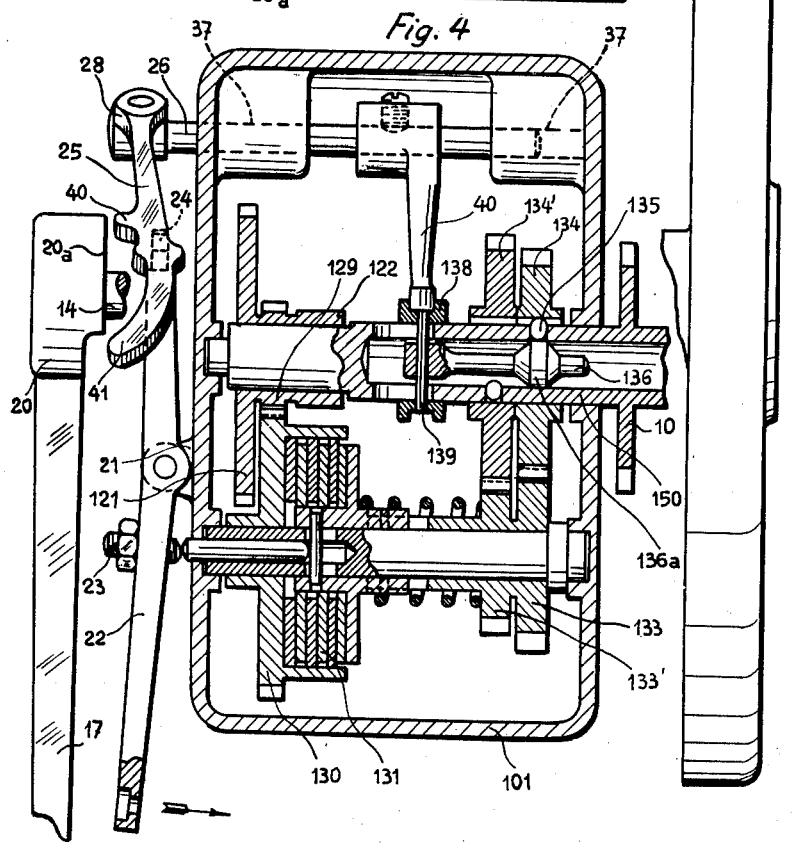
INVENTOR
ALDO FARINELLI
By Young, Emery & Thompson
ATTYS May 13, 1952     A. FARINELLI     2,596,391
AUXILIARY MOTOR FOR BICYCLES Filed Nov. 1, 1946     7 Sheets-Sheet 5

INVENTOR
ALDO FARINELLI
BY
Young, Emery & Thompson
ATTYS.

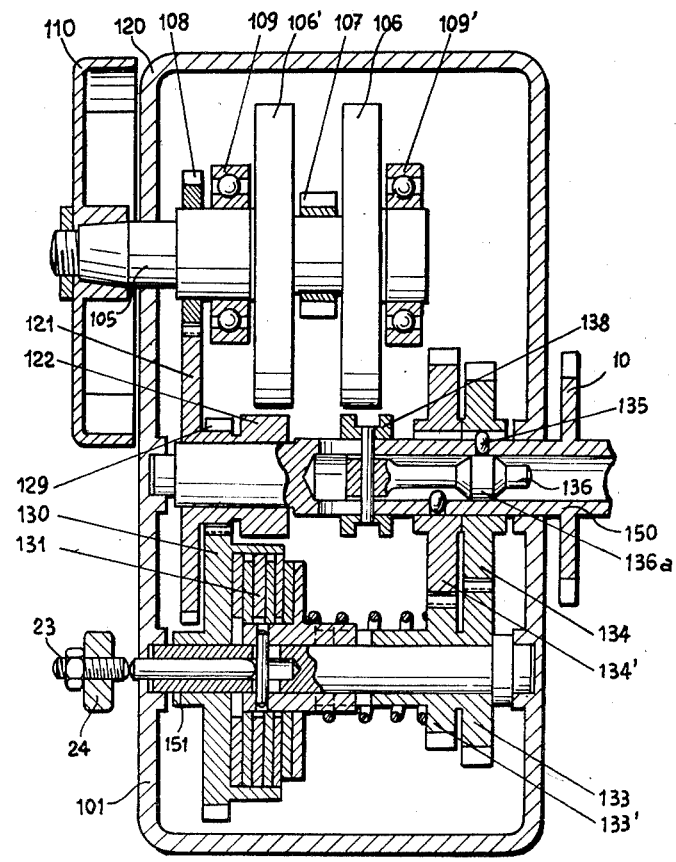

May 13, 1952  A. FARINELLI  2,596,391
AUXILIARY MOTOR FOR BICYCLES
Filed Nov. 1, 1946  7 Sheets-Sheet 7

INVENTOR
ALDO FARINELLI
BY Young, Emery & Thompson
ATTYS-

Patented May 13, 1952

2,596,391

UNITED STATES PATENT OFFICE 2,596,391

AUXILIARY MOTOR FOR BICYCLES

Aldo Farinelli, Turin, Italy

Application November 1, 1946, Serial No. 707,239
In Italy May 17, 1944

Section 1, Public Law 690, August 8, 1946
Patent expires May 17, 1964

2 Claims. (Cl. 180—33)

The object of this invention is an auxiliary motor unit applicable to any normal bicycle at the lowest and most resistant central point of the bicycle, retaining for the transmission by pedal or engine the single existing chains. In addition, another object of the invention is to adapt to this transmission a supplementary two speed gear, which may be operated by an automatic device, so as to avoid a double control of the existing change speed gear. According to the invention, these objects are achieved by particularly simple means, ensuring direct transmission between the motor and drive wheel of the bicycle.

The annexed drawing shows diagrammatically and by way of example, an embodiment of the invention.

Fig. 1 is a fragmentary elevational view of an installation of a motor to a bicycle.

Fig. 2 is a fragmentary plan view partly in section of the installation of Fig. 1.

Fig. 3 is a perspective partially exploded view of an engine and the portion of a bicycle to which it is to be applied.

Fig. 4 is a sectional view of the transmission including the clutch and change speed gearing.

Fig. 6a is a fragmentary plan view of the shift preselector device in one position.

Fig. 6b is a fragmentary plan view of the shift pre-selector device in another position.

Fig. 6c is a fragmentary plan view of the shift pre-selector device in a third position.

Fig. 7 is a sectional view of the motor taken on line VII—VII of Fig. 8.

Figure 5:
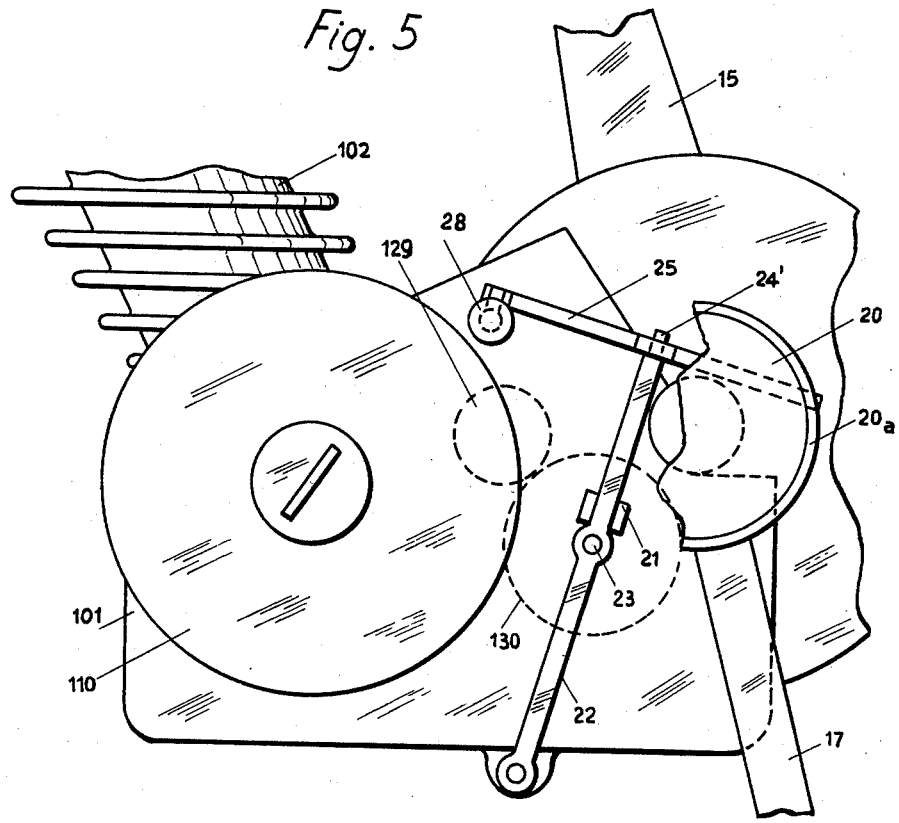
Fig. 5 is a fragmentary elevational view of the motor housing.

In the diagrammatic representation of Figs. 1 and 2, the internal characteristics of the engine, which may be of the two or four stroke type, are omitted, the only condition being that it should be narrow enough to be fitted in the space between the two pedal cranks and that it should preferably be fitted with an internal clutch which may be operated from the left side, and a transmission shaft on the right side on the extension of the secondary shaft of the two speed gear.

In planning the engine, care must be taken that the axis the driving shaft 150 is within a radius of about ten centimeters from the axis of the recess 2 in the crank case, which is coaxial with the spindle of the bottom pedal shaft housing or bracket 4. The driving shaft should be at such a height that its axis and the axes of the pedal crank and rear hub lie approximately in the same plane.

In other words, the condition required for the use of the transmission is that the outside of the engine unit should be of a form approximately as shown in the diagrams of Figs. 1 and 2, so that the engine unit may be placed with a recess 2 underneath and around the front part of the bottom bracket 4 and with the longitudinal recess 5 against the tube 3. Fig. 3 shows how these conditions may be met; the hollow 2 is applied against the bottom bracket by means of two collars 6, 6' with bored ends engaging two bolts 6a fast with the engine casing, and the hollow 5 is held on the tube or bar 3 by means of an attachment 7 provided with holes engaging two further bolts 7a likewise with the engine casing. The attachment 7 is connected to a clamp 8 clamped on a seat pillar 9 of the bicycle.

The engine driving shaft 150 carries a sprocket 10 transmitting motion through a chain K to the sprocket 12, Fig. 2 carried by the hub of the rear wheel. The end of the shaft 150 has mounted thereon with the interposition of a free wheel clutch of a known type, and therefore not illustrated in detail on the drawing, a pinion 11 consisting of two circular plates carrying a series of circumferential rollers. The pinion 11 meshes with an internally toothed gear wheel 13, which is secured by a cotter pin 18 to the axle 14 in place of the right-hand pedal crank. Said internally toothed crown 13 carries in its plane a rigid extension 15 serving as a crank, into a threaded hole of which is screwed the original right pedal $P_1$, taken from the unused pedal crank of the bicycle.

On the opposite side of axle 14 the original crank 17 with the corresponding pedal $P_2$ still remains in operation. The above-described transmission mechanism permits direct drive by means of chain K between the driving pinion 10 and pinion 12 of the hub of the rear wheel, while the shaft 14 of the pedals is not driven because of the free wheel interposed between the pinion 11 and driving shaft 150. By acting on the pedals $P_1$, $P_2$, the said free wheel permits driving of pinion 10.

The engine is provided with a clutch and a variable two speed gear. Means are also provided to effect the control of the variable speed gear and the clutch coacting with the left hand pedal crank in order to preselect the speed required.

A motor construction suitable for this purpose is diagrammatically shown in Figs. 4, 5, 6, 7 and 8. A cover 20 is fitted to the left end of the axle 14 in such a way that its cam edge 20a forming a crown extends over about 200° of its circumference towards the bicycle beyond the interior face of the pedal crank 17. Said cover is also connected in any known manner to the pedal crank 17. A lever 22 is pivoted at 21 on the left side of the engine case. This lever acts, by means of a regulating screw 23, on the push rod which operates the engine clutch 131 in the usual way, and is articulated at its upper end 24 close to the pedal axle 14 to another lever 25. Lever 25 acts by its forward end 28 on the outer end of a rod 26, slidable in the guides 37 formed in the motor case walls. A forked lever 49 fitted to said rod 26 and moving therewith engages the collar of a ring 138 slidable on the shaft 150 and connected by means of a pin 139 to a secondary rod 136 slidable in the hollow part of the shaft 150, in order to throw in the required speed, Fig. 4.

The device operates as follows: the operation lever 22 effects declutching; at the same time, the upper end 24 of this lever moves outwards the central part of the lever 25 which is pivoted to it. If the cam edge 20a of the cover 20 is between the points 24 and 28, lever 25 acts as a lever of the first order, finding its point of support 40 on the edge 20a of the cover, the effort at 24 and load at 28. The latter point is then moved inwards, pressing rod 26 axially and throwing in one of the speeds. On the other hand, if, by rotation of the pedals, the cover 20 is turned through 180°, the same declutching movement of the lever 22 will result in lever 25 as a lever of third order; the point of support 41 will be moved with the edge 20a of the cover 20 to the rear end of the lever 25, which will move its end 28 outwards. Rod 26 is then displaced and the gear is changed. If the cover 20 is stopped in an intermediate position so that its edge 20 encounters lever 25 at two points 40 and 41 diametrically or almost diametrically opposite, this lever under the action of the lever 22 is placed parallel to the motor casing wall, moving the rod 26 to an intermediate position between the limits of its stroke, which corresponds to the neutral position of the change speed gear.

The cover 20 therefore acts as a preselector of the required speed, engagement of which is automatic by the simple operation of the clutch, according to the pedal position; for instance, left pedal forward, first speed; right pedal forward, second speed, pedals vertical, neutral.

Figs. 6a, 6b and 6c show diagrammatically the three positions of the cover 20 and lever 25 described above corresponding to the first speed, neutral and second speed position of the rod 26.

Figure 8:
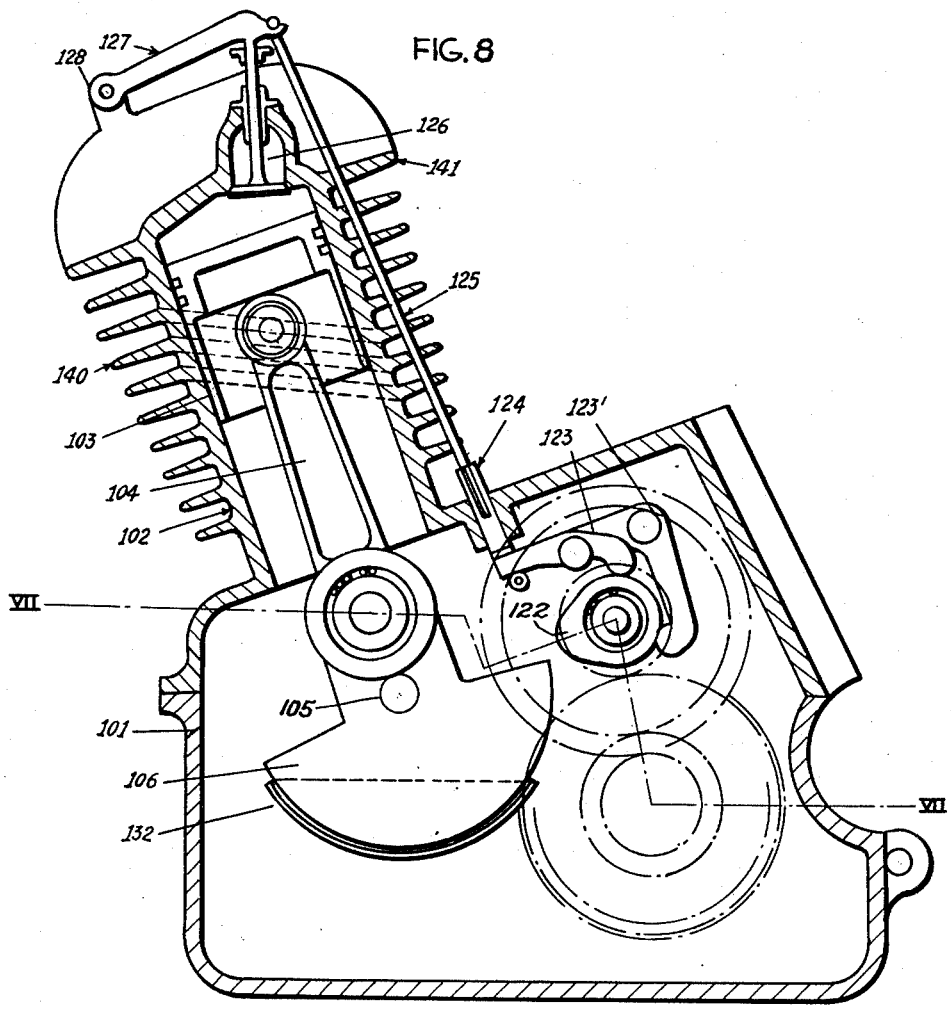
Fig. 8 is a vertical sectional view of the motor on a plane passing therethrough perpendicularly to the axis of the crank shaft.

Figs. 4, 7 and 8 show a four stroke internal combustion engine meeting the requirement of the transmission system described above.

101 is the engine crank case of the motor, 102 the cylinder, 103 the piston, 104 the connecting rod, 105 the crank shaft mounted on ball bearing 109, 109' and carrying the counterweights 106 and 106' linked together by a crank pin 107. 110 is the engine flywheel. A gear wheel 108 with a small number of teeth (say twelve or thirteen) is fitted on the left side of the crank shaft, and the rotor 110 of a magnetic fly wheel is mounted outside of the casing on a cone terminating the shaft 105 on that side.

The toothed wheel 108, solid with the crank shaft engages a toothed wheel 121 with double the number of teeth, idly mounted on the driving shaft 150 of the engine. The hub of wheel 121 is formed directly on the cam 122 for the operation of the valve mechanism. The same cam 122 serves for the induction and exhaust valve control, the corresponding rocker arms 123 and 123', acting on the tappet rod 125, being arranged in the manner clearly shown in Fig. 8. The bulk of a special cam shaft is thus avoided. The tappet rod 125 acts under tension and not by compression, on the stem of the valve 126 by means of rods 125, and the levers 127 pivoted at 128 on the extensions of the wings of the cylinder head. A gear 129, integral with gear 121, engages the external teeth of a crown 130 mounted on a shaft 151. The crown 130 is the driving member of a friction clutch loosely mounted on the shaft 151. The crown 130 is the driving member of a friction clutch embodying metal discs 131, of which the driven member is slidably splined on the shaft 151.

Said crown may be utilized for lifting the lubricating oil from the bottom of the casing and throwing it on the various gears inside the casing and in a sump 132 fitted under the counterweights of the crank shaft. Said counterweights lubricate the inside of the cylinder by splashing the excess oil falling inside the casing.

Two gears 133 and 133' are keyed on shaft 151 permanently in mesh with two gears 134 and 134', respectively, mounted on shaft 150. Gears 134 and 134' may be selectively keyed on shaft 150 by means of a slidable rod 136 provided with an enlarged portion 136a cooperating with balls 135 mounted in radial slots in shaft 150. One end of rod 136 is connected to the grooved ring 138 axially displaceable by means of a forked lever 49 (Fig. 4).

This affords between the crank shaft and output sprocket 10 of the transmission a great reduction in ratio by means of the pairs of gears 108—121, 129—130 and 133—134 or 133'—134'.

I claim:

1. In combination with a bicycle having a pedal crank shaft housing, a front diagonal bar, an upwardly extending seat pillar and a rearwardly extending fork, a pedal crank shaft, left and right pedal cranks extending from the ends of the pedal crank shaft, a rear wheel carried by the rear fork and a sprocket on the rear wheel, an auxiliary motor unit comprising an internal combustion engine having a crank case, an output shaft parallel with the said pedal crankshaft, means for attaching said engine to the bicycle frame, in front of and underneath the pedal shaft housing and against the front diagonal bar, a chain sprocket carried by the engine output shaft, a chain connecting said sprocket with the rear wheel sprocket of the bicycle, a toothed wheel freely mounted on said engine output shaft, a free wheel clutch interposed between said toothed wheel and the engine output shaft, an internally toothed crown wheel on the right pedal of the bicycle, said crown wheel being directly in mesh with the toothed free wheel on the engine output shaft.

2. In combination with a bicycle having a pedal crank shaft housing, a front diagonal bar, an upwardly extending seat pillar and a rearwardly extending fork, a pedal crank shaft, left and right pedal cranks extending from the ends of the pedal crank shaft, a rear wheel carried by the rear fork and a sprocket on the rear wheel, an auxiliary motor unit comprising an internal combustion engine having a crank case, an output shaft parallel with the said pedal crankshaft, means for attaching said engine to the bicycle frame, in front of and underneath the pedal shaft housing and against the front diagonal bar, a chain sprocket carried by the engine output shaft, a chain connecting said sprocket with the rear wheel sprocket of the bicycle, a toothed wheel freely mounted on said engine output shaft, a free wheel clutch interposed between said toothed wheel and the engine output shaft, an internally toothed crown wheel on the right pedal shaft of the bicycle, said crown wheel being directly in mesh with the toothed free wheel on the engine output shaft, a clutch actuating lever pivotally mounted on the left crank case wall, a change speed lever pivoted at the upper end of said clutch actuating lever and having two projections at its free end and at an intermediate point of its length, respectively, and a cam edge carried by the left end of the pedal shaft, said cam edge extending through an arc of about 200° of a circumference having a diameter equalling the distance between the said two projections, and being adapted to form supports for the said projections in the unclutched position of the said lever.

ALDO FARINELLI.

REFERENCES CITED

The following references are of record in the file of this patent:

UNITED STATES PATENTS

| Number | Name | Date |
|---|---|---|
| 486,055 | Saladee | Nov. 8, 1892 |
| 833,584 | Cress | Oct. 16, 1906 |
| 1,064,602 | Bond | June 10, 1913 |
| 1,097,546 | Harley | May 19, 1914 |
| 2,212,279 | Steinlein et al. | Aug. 20, 1940 |
| 2,232,090 | Anderson | Feb. 18, 1941 |

FOREIGN PATENTS

| Number | Country | Date |
|---|---|---|
| 96,405 | Switzerland | Oct. 2, 1922 |
| 253,623 | Switzerland | Nov. 16, 1948 |
| 253,790 | Switzerland | Nov. 16, 1948 |
| 347,797 | Germany | Jan. 28, 1922 |
| 553,921 | France | Feb. 20, 1923 |